No. 810,793. PATENTED JAN. 23, 1906.
W. R. McKEEN, Jr. & A. H. FETTERS.
VEGETATION DESTROYER.
APPLICATION FILED MAY 25, 1905.
4 SHEETS—SHEET 1.
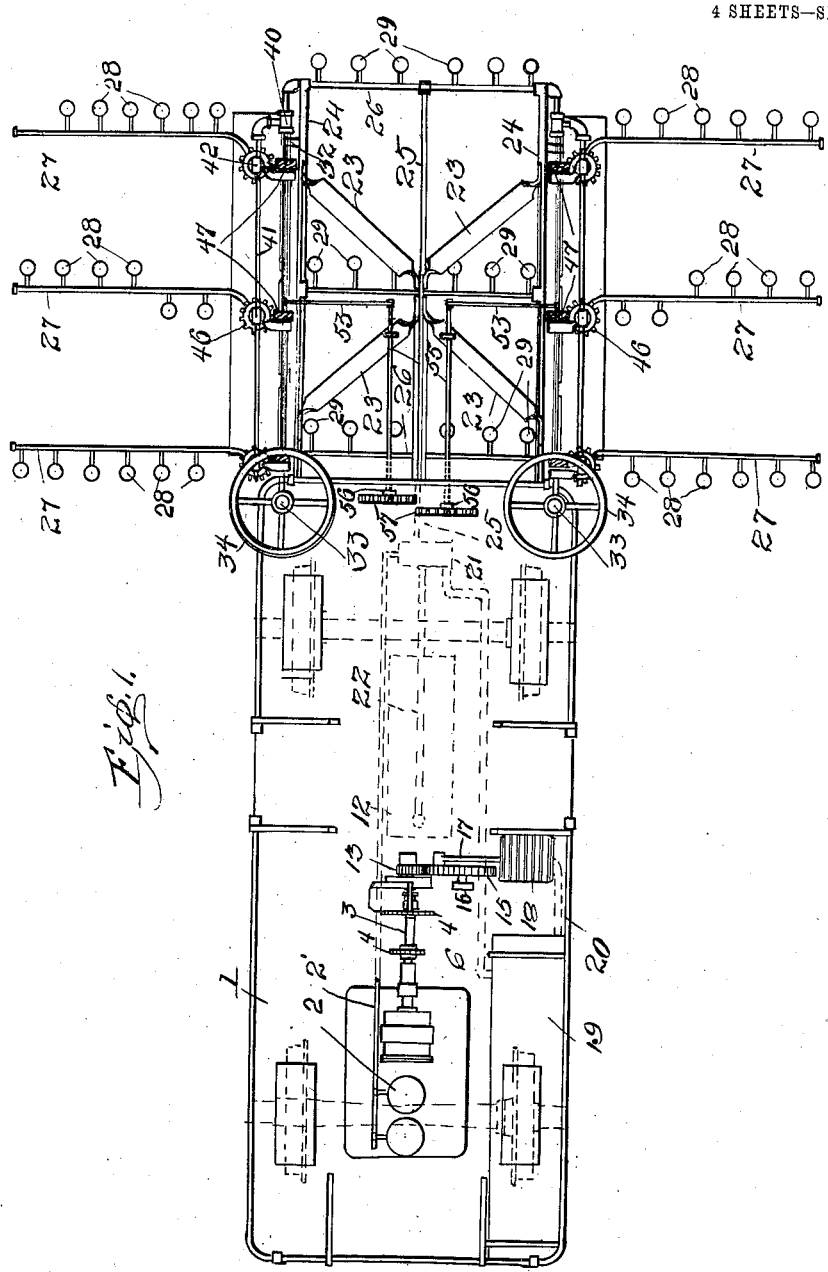

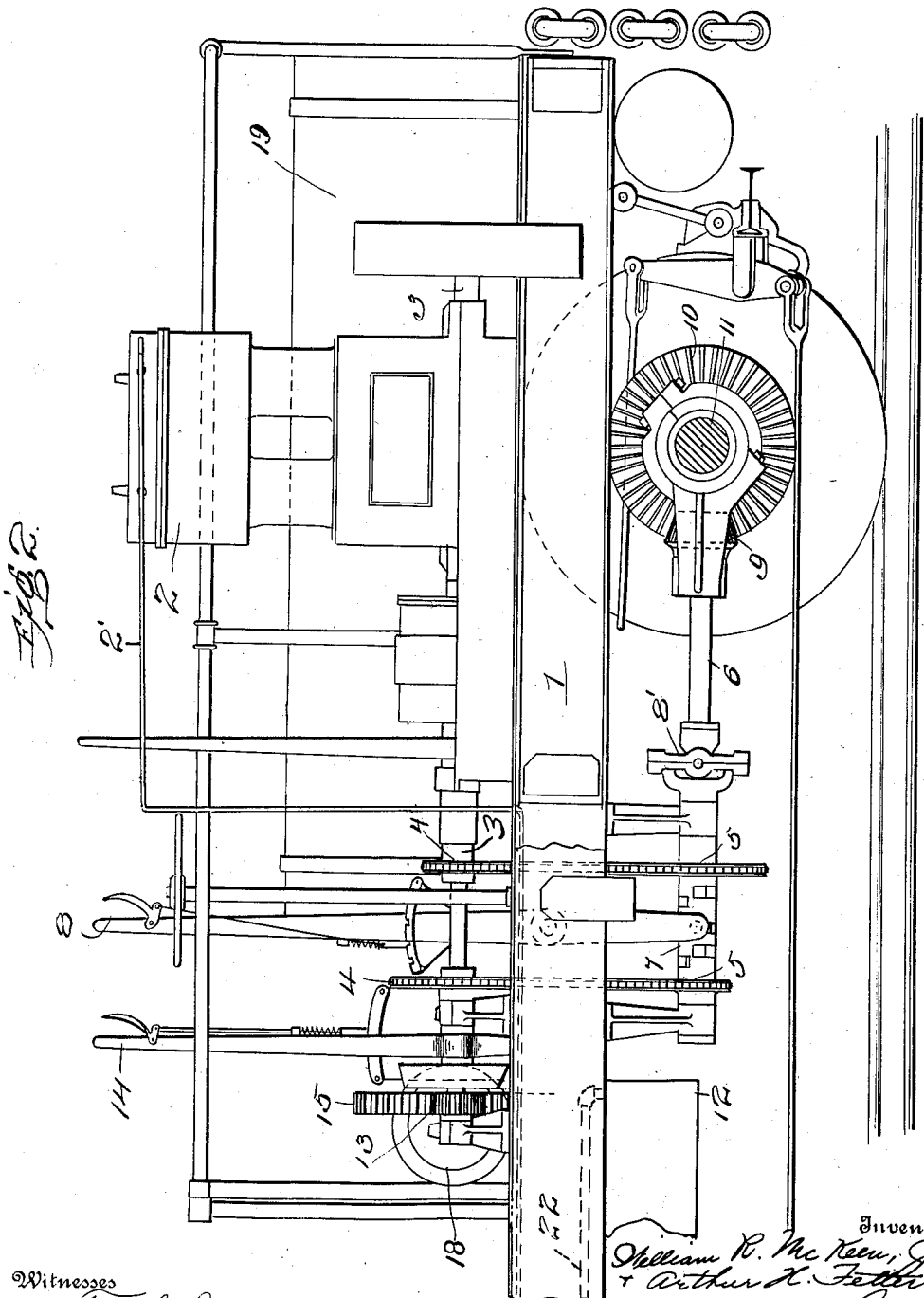

No. 810,793. PATENTED JAN. 23, 1906.
W. R. McKEEN, Jr. & A. H. FETTERS.
VEGETATION DESTROYER.
APPLICATION FILED MAY 25, 1905.
4 SHEETS—SHEET 3.
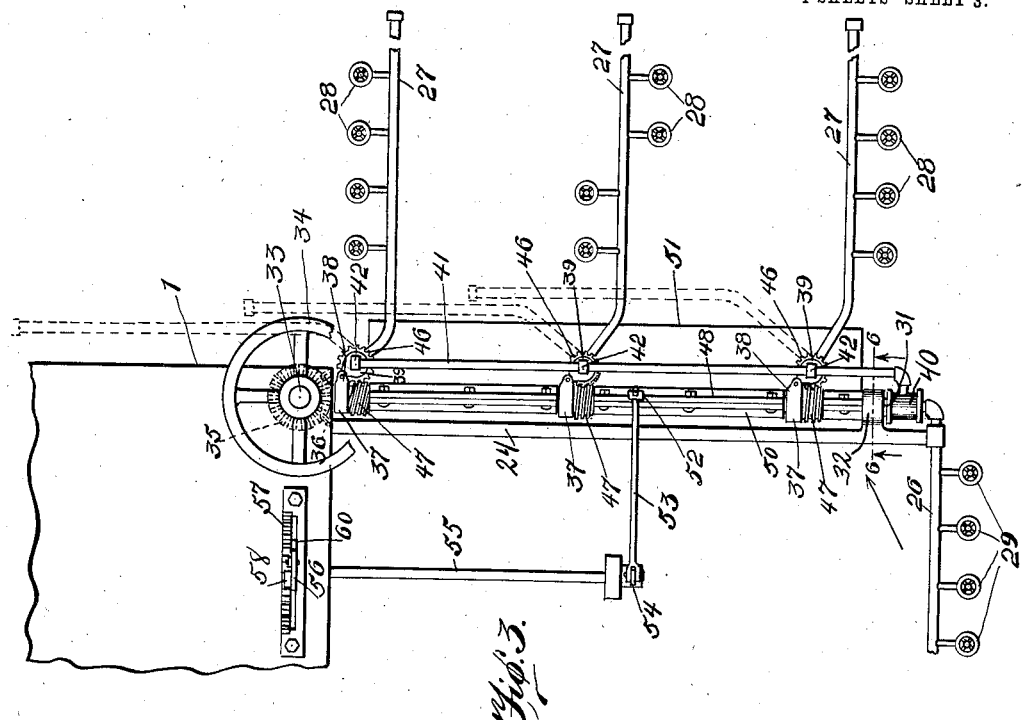
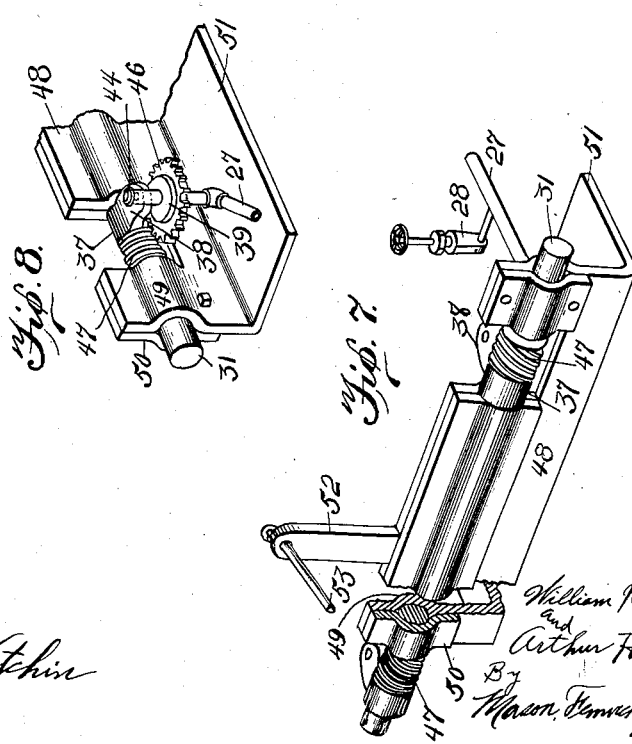
Witnesses
D. C. Wilson.
Edgar M. Kitchin.
Inventors
William R. McKeen, Jr.
and
Arthur H. Fetters,
By
Mason, Fenwick & Lawrence, Attorneys.

No. 810,793. PATENTED JAN. 23, 1906.
W. R. McKEEN, Jr. & A. H. FETTERS.
VEGETATION DESTROYER.
APPLICATION FILED MAY 25, 1905.
4 SHEETS—SHEET 4.
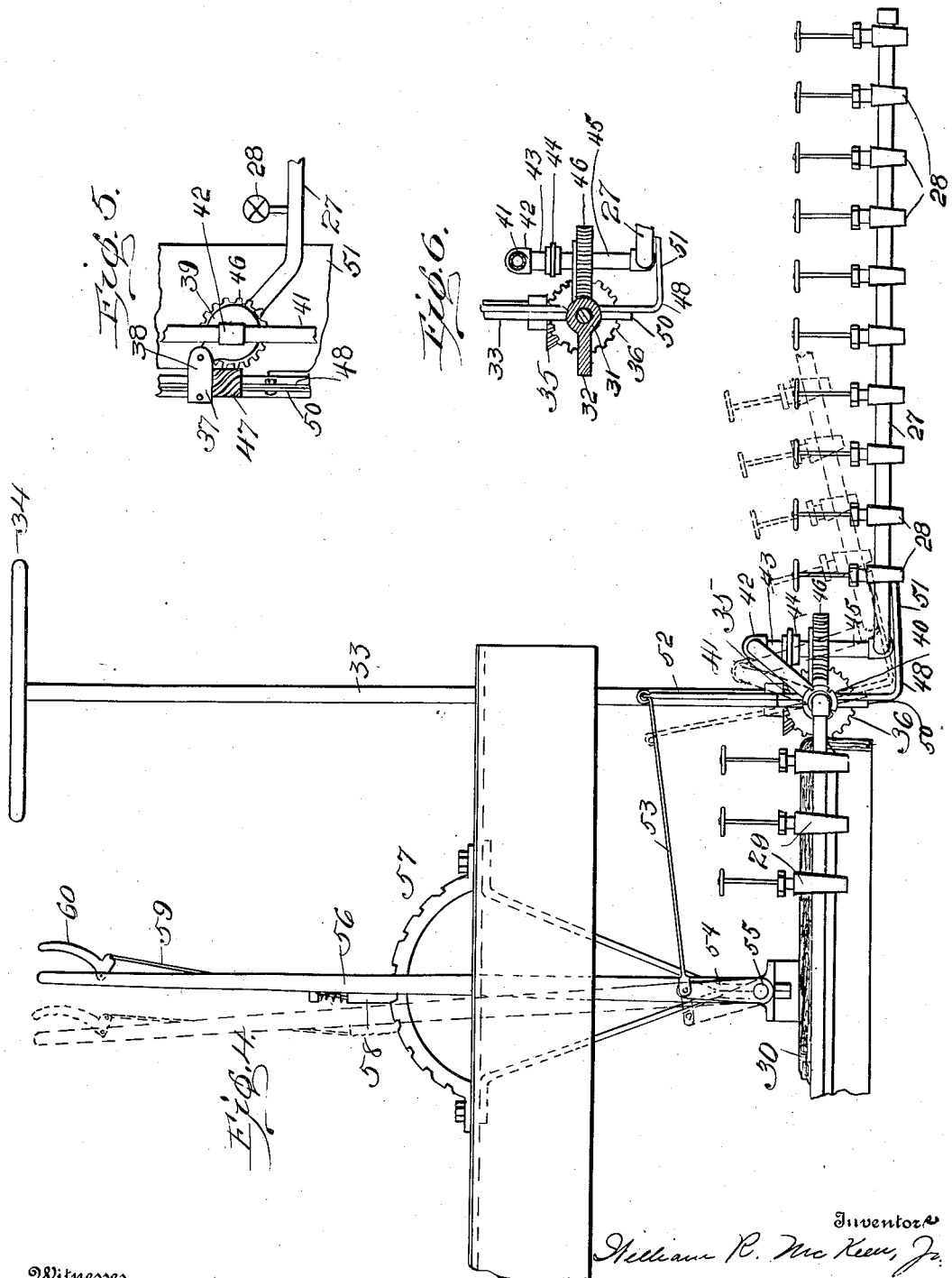

UNITED STATES PATENT OFFICE.

WILLIAM R. McKEEN, JR., AND ARTHUR H. FETTERS, OF OMAHA, NEBRASKA.

VEGETATION-DESTROYER.

No. 810,793.      Specification of Letters Patent.      Patented Jan. 23, 1906.

Application filed May 25, 1905. Serial No. 262,289.

*To all whom it may concern:*

Be it known that we, WILLIAM R. McKEEN, Jr., and ARTHUR H. FETTERS, citizens of the United States, residing at Omaha, in the county of Douglas and State of Nebraska, have invented certain new and useful Improvements in Vegetation-Destroyers; and we do hereby declare the following to be a full, clear, and exact description of the invention, such as will enable others skilled in the art to which it appertains to make and use the same.

This invention relates to vegetation-destroyers, and more particularly to means of this type adapted for use in destroying weeds and other vegetation along the right of way of railways.

One of the objects thereof is to provide efficient mechanism of the above type adapted to be adjustable so as to act upon the vegetation adjacent a track irrespective of the inclination of the ground at such point.

Another object is to provide simple means of this type adapted to be compactly folded without encumbering the vehicle upon which it is used.

Another object is to provide practical means of the above general type wherein a common source of energy is used as a source of supply, both for the vegetation-destroying mechanism and for the motive power of the vehicle upon which such mechanism is positioned.

Another object is to provide vegetation-destroying means which are adapted to operate about an obstruction without the necessity for drawing the parts away from the ground.

Other objects will be in part obvious and in part pointed out hereinafter.

The invention accordingly consists in the features of construction, combinations of elements, and arrangement of parts which will be exemplified in the apparatus hereinafter described, and the scope of the application of which will be indicated in the following claims.

In the accompanying drawings, wherein is shown one of various possible embodiments of our invention, Figure 1 is a plan of the same. Fig. 2 is a sectional elevation of certain parts shown in Fig. 1, the same appearing on a slightly larger scale. Fig. 3 is a plan of burner-arms and parts associated therewith. Fig. 4 is an end elevation of parts appearing in Fig. 3. Fig. 5 is a detailed top plan showing burner-arm connections. Fig. 6 is a vertical cross-section taken substantially on the line 6 6 of Fig. 3. Fig. 7 is a perspective view of parts appearing in Fig. 3, the view being taken in the direction indicated by the arrow and certain portions being broken away. Fig. 8 is a similar view of parts shown in Fig. 7, taken from the opposite side.

Similar reference characters refer to similar parts throughout the several views of the drawings.

As tending to render clearer several features of our invention, it may here be noted that we have found that it is highly desirable in connection with apparatus of the nature of that with which this invention deals to provide means whereby it is rendered self-moving, thus doing away with the necessity for employing a locomotive or other independent source of propulsory power. In this manner the cost of operating, both with regard to fuel and labor, is materially reduced and the entire mechanism better adapted to the conditions with which it is to deal. It may also be noted that we have found that if it be attempted to use laterally-extending burner-arms it is highly desirable that means be provided whereby the same can be compactly folded without encumbering the platform of the vehicle and without the necessity of drawing the same away from the ground and rendering them inoperative upon encountering obstructions along the right of way. It may also be noted at this point that we have found in the use of laterally-extending burner-arms that in order to maintain the same operative upon the ground the inclination of which is varying, as in the case of ditches or embankments, a vertical movement of the burner-arms is desirable. The above and other advantages are attained in constructions of the nature of that hereinafter described.

Referring now to Fig. 1 of the accompanying drawings, there is shown a car body or platform 1, upon which there is mounted an engine 2, preferably of the internal-combustion type. The crank-shaft 3 of engine 2 has fixed thereon sprockets 4 of different sizes, connected, as by sprocket-chains 5, with coacting sprockets upon a driving-shaft 6. The last-mentioned sprockets are loosely mounted upon shaft 6 and interposed between the same, and keyed upon this shaft is a double-faced clutch member 7, adapted to be thrown, as by lever 8, into engagement with coacting clutch members upon one or the other of these last-mentioned sprockets. Shaft 6 leads through a universal joint 8' to a bevel-pinion 9, intermeshing with a bevel-gear 10, fast upon the axle 11 of the car. A gasolene-tank 12 is preferably arranged beneath the platform 1 and is adapted to supply gasolene through a pipe 22 to a carbureter 21 of any preferred type, the said carbureter in turn supplying fuel for the engine 2 through any suitable supply means, as a pipe 2'. Shaft 3 projects beyond the sprockets 4 and the end thereof is connected with a gear 13 by clutch mechanism of well-known construction controlled by a lever 14. Gear 13 meshes with a gear 15, mounted as shown at 16 and provided with a wrist-pin engaging a pitman-rod 17, which drives a pump 18. This pumping mechanism is adapted to supply compressed air to a tank 19 through a suitable connection 20, this tank serving to supply air-pressure for forcing the gasolene or other hydrocarbon from the tank 12. Tank 19 may also be used as a source of supply for pressure for the brake mechanism of the car as well as for the carbureter 21. (Shown in dotted lines in Fig. 1.) It will thus be seen that by means of the clutch 7 the car may be driven at either a low or high speed, according as the same is being used to accomplish its purpose as a vegetation-destroyer or is merely being driven to or from the region in which it is used. The pump 18, moreover, driven, as above described, through the clutch controlled by lever 14, supplies compressed air not only for operating the brakes of a car in a well-known manner, but for forcing the hydrocarbon from the tank 12 as well as to be used in connection with the carbureter 21.

At the rear of the car is mounted a rigid framework comprising cross-bars 23, stiffened and held in position by the longitudinal bars 24, as shown most clearly in Fig. 1 of the drawings. Upon this framework is mounted a longitudinal supply-pipe 25, communicating with the branch pipes 26 shown at the rear of the frame. The pipes 25 and 26 constitute a main distributing system from the tank 12, through which the gasolene or other liquid fuel is forced, as hereinafter described, to burner-arms 27, provided with burners 28. Upon the cross-tubes 26, moreover, are arranged burners 29, the same being rigidly mounted and substantially level, as they are to coact with the evenly-graded ground comprised between or closely adjacent the rails. These burners, moreover, are provided with an asbestos blanket 30, (best shown in Fig. 4 of the drawings,) adapted to direct the heat downward and render its action more intense as well as to protect the operators of the car from the unpleasant effects thereof.

Arranged parallel to and immediately outside of each of the bars 24 and supported thereon by the bearings 32 are longitudinal shafts 31. As the mechanism associated with these shafts as well as with the burner-arms 27 is identical upon both sides of the car, that upon one side only will be described in detail. Shaft 31 is driven through the bevel-gears 35 and 36, the former of which is fixed upon a vertical shaft 33, provided with a hand-wheel 34.

Loosely mounted upon shaft 31 adjacent each of the burner-arms 27 is a sleeve 37, provided with projecting flanges 38 and providing through plates 39 supports for worm-wheels 46, meshing with worms 47, fixed upon this shaft. It will thus be seen that as shaft 33 is rotated from the hand-wheel 34 the worm-wheels 47 are correspondingly turned and through a connection hereinafter described the several burner-arms swing in a horizontal direction, so as to be compactly folded, as shown in the dotted lines of Fig. 3.

The rearmost pipe 26 is curved toward and discharges into a swivel-T 40, the opposite end of which is rotatably mounted upon the adjacent end of the shaft 31. The intermediate opening of the T leads through a pipe 41 upwardly in a diagonal direction and is bent so as to extend horizontally past the several plates 39. Opposite each of these plates the pipe 41 is provided with a T 42, (best shown in Fig. 3 of the drawings,) from which there leads downwardly a pipe 43, connected, as by swivel-coupling 44, with a depending pipe 45, which in turn leads to the burner-arm 27. The worm-wheel 46, above referred to, is fixed upon the pipe 45, and it will thus be seen that upon this wheel being rotated, as above described, the corresponding burner-arm 27 is swung about the center of the pipe 45 as an axis, such movement being permitted by the swivel 44 without interfering with the flow of fuel thereto.

In order to provide the desired vertical swinging movement of the burner-arms 27 for the purpose hereinbefore referred to, there is provided a plate 48, loosely clamped about the shaft 31, as at 49, and held in position by the plate 50. (Best shown in Fig. 7 of the drawings.) Plate 48 projects below the burner-arms 27, as shown at 51, and is adapted upon being rotated about its bearing on shaft 31 to swing all of the burner-arms and connections thereto as well as the worm-wheels 46 about this shaft as an axis, such movement being permitted by reason of the T 40, swiveled upon the end of the shaft, as above described. This swinging movement is brought about through the arm 52, rigidly connected with the plate 48 and having connection, as by a link 53, with a crank 54, fixed upon a rock-shaft 55. The latter member is rocked by means of a hand-lever 56, provided with a spring-pressed locking-pawl 58, coacting with the sector 57, and connected, as by link 59, with the grip-lever 60.

The operation and method of use of the described embodiment of our invention may be set forth most clearly by describing, first, the manner in which the burner-arms are folded in a longitudinal direction; secondly, the method of raising the same in a vertical direction, and, thirdly, tracing the supply of fuel to the burner-arms. Assuming that it is desired to fold the arms in a longitudinal direction, as for the purpose of compactly stowing them away or to burn about an obstruction, the shaft 31 is rotated by means of the hand-wheel 34 through bevel-gears 35 and 36, and through worms 47 and worm-wheels 46 swings the several burner-arms about the respective swivels 44 as pivots. As the hand-wheels 34 are positioned closely adjacent one another, it will readily be seen that the same are under the control of a single operator. The vertical movement of the burner-arms is brought about by the lever 56, which upon being released from the locking-sector 57 and thrown in either direction is adapted to swing the entire lateral burner-frame about the shaft 31 through the connection above described. When lever 56 is swung in one direction, the burner-arms 27 will be depressed, so as to assume a position substantially parallel to the side of a ditch, and when the lever 56 is swung in an opposite direction said arms are raised, so as to coact in like manner with an embankment inclined toward the track. The pawl 58 in an obvious manner serves to lock these arms in any desired position. It may here be noted that this vertical movement is entirely independent of the above-described longitudinal swinging movement, the sector 57 and the worms 47 serving to lock the arms against movement in the direction in which they are to be actuated by the respective mechanisms comprising these elements. The fuel-supply passing through pipes 25 and 26 is led through the swivel-T 40 and inclined pipe 41 to the T's 42, from which points it is transmitted through the vertical connections 45 to the respective burner-arms, the swivel 44 serving to permit any desired swinging movement in a longitudinal direction.

It will thus be seen that we have provided a device in which the several objects of this invention are accomplished and the advantages hereinbefore mentioned are, among others, inherent. The vertical swinging, as above described, permits the burner-arms to coact with the ground irrespective of the inclination of the right of way. The longitudinal swinging not only permits the burner-arms to be compactly folded, as above set forth, but allows the same to remain in operative position and completely destroy all vegetation adjacent to the track, even though obstructions prevent the same being used fully extended at right angles with the car. By the use of the single agent to accomplish the two purposes of propelling the vehicle and efficiently burning the vegetation no auxiliary apparatus to perform either of these functions is necessary. The entire mechanism is compact, simple, inexpensive, and practical in construction and is efficient and thoroughly reliable in action.

As many apparently widely different embodiments can be made without departing from the scope of our invention, we intend that all matter set forth in this description or shown in the accompanying drawings shall be interpreted as illustrative and not in a limited sense.

Having described our invention, what we claim as new, and desire to secure by Letters Patent of the United States, is—

1. In apparatus of the class described, in combination, a vehicle, a laterally-projecting burner-carrying arm mounted thereon, and means upon said vehicle for swinging said arm about a substantially vertical axis toward a position parallel to said vehicle.

2. In apparatus of the class described, in combination, a vehicle a burner-carrying arm laterally projecting from said vehicle and pivotally mounted thereon, means upon said vehicle adapted to supply fuel to said burner-carrying arm, and means upon said vehicle adapted to swing said burner-carrying arm about a substantially vertical axis into a position in which the same is substantially parallel to said vehicle.

3. In apparatus of the class described, in combination, a car, an internal-combustion engine mounted on said car, means adapted to drive such car from said internal-combustion engine, a source of hydrocarbon-supply for said internal-combustion engine mounted upon said car, connections between said source of supply and said engine, weed-burning arms mounted upon said car, connections between said source of supply and said weed-burning arms adapted to supply hydrocarbon thereto, and means upon said car adapted to swing said arms in a plane extending parallel to said car.

4. In apparatus of the class described, in combination, a vehicle, a laterally-projecting weed-burning arm mounted upon said vehicle, means upon said vehicle adapted to swing said arm about a substantially vertical axis, and means upon said car adapted to swing said arm about a substantially horizontal axis.

5. In apparatus of the class described, in combination, a car, a laterally - projecting weed-burning arm mounted upon said car, means upon said car adapted to swing said arm about a substantially vertical axis, and independent means thereon adapted to swing said arm about a substantially horizontal axis.

6. In apparatus of the class described, in combination, a car, a laterally - projecting weed-burning arm mounted upon said car, means upon said car adapted to swing said arm about a substantially vertical axis, means thereon adapted to swing said arm about a substantially horizontal axis, and means adapted to lock said last - mentioned means in predetermined positions.

7. In apparatus of the class described, in combination, a car adapted to travel upon a track, weed-burning means mounted upon said car parallel to said track, and adapted to coact with the ground comprised between the rails thereof, a relatively movable weed-burning arm upon each side of said car and means upon said car adapted to swing said arms in a plane parallel thereto.

8. In apparatus of the class described, in combination, a car, a shaft upon said car, a burner-carrying arm adapted to swing about said shaft, a gear upon said burner-carrying arm, a gear upon said shaft meshing with said first-mentioned gear and adapted to swing said arm in a plane extending parallel to said car, means upon said car adapted to rotate said shaft and means upon said car adapted to swing said arm about said shaft.

9. In apparatus of the class described in combination, a car, a shaft upon said car, a burner-carrying arm adapted to swing about said shaft, a gear upon said burner-carrying arm, a gear upon said shaft meshing with said first-mentioned gear and adapted to swing said arm in a plane extending parallel to said car, means upon said car adapted to rotate said shaft, means upon said car adapted to swing said arm about said shaft, a source of fuel-supply upon said car and connections adapted to transmit fuel from said source of supply to said arm irrespective of the position thereof.

10. In apparatus of the class described, in combination, a car, a series of burner-carrying arms mounted thereon and adapted to swing in planes transverse of said car, a plate extending longitudinally of said car and projecting beneath said burner-carrying arms, and means upon said car adapted to swing said plate and said burner-carrying arms, and lock the same in predetermined positions.

11. In apparatus of the class described, in combination, a car, an internal-combustion engine mounted upon said car, means adapted to drive said car from said internal-combustion engine, a source of hydrocarbon-supply for said internal-combustion engine mounted upon said car, connecting means between said source of supply and said engine, a weed-burning arm mounted upon said car, connecting means between said source of supply and said weed-burning arm adapted to supply hydrocarbon thereto, an air-compressor upon said car driven from said engine a tank upon said car connected with said air-compressor and adapted to store air compressed thereby, and carbureting means for said hydrocarbon mounted upon said car and connected with said tank and with said source of supply.

In testimony whereof we affix our signatures in presence of two witnesses.

WILLIAM R. McKEEN, Jr.
ARTHUR H. FETTERS.

Witnesses:
EDGAR M. KITCHIN,
CHARLES L. DUNDEY.